United States Patent [19]

Sellers

[11] Patent Number: 5,039,468
[45] Date of Patent: Aug. 13, 1991

[54] METHOD OF MAKING A STAINED GLASS ARTICLE

[76] Inventor: Stephen N. Sellers, 4725 Wiley Davis Rd., Greensboro, N.C. 27407

[21] Appl. No.: 469,266

[22] Filed: Jan. 24, 1990

[51] Int. Cl.$^5$ .................. B29C 39/10; B29C 39/12
[52] U.S. Cl. .................................. 264/225; 156/63; 264/247; 264/245; 264/261; 264/271.1; 428/38
[58] Field of Search ............... 364/219, 220, 225, 226, 364/227, 247, 245, 255, 261, 263, 279, 254, 271.1; 156/62, 63; 428/38

[56] References Cited

U.S. PATENT DOCUMENTS

| | | | |
|---|---|---|---|
| 3,183,140 | 5/1965 | Gibson . | |
| 3,420,925 | 1/1969 | Sharif | 264/102 |
| 3,563,835 | 2/1971 | Nussbaum et al. | 156/63 |
| 3,619,456 | 11/1971 | Taylor | 264/245 |
| 3,713,958 | 1/1973 | McCracken | 156/63 |
| 3,769,114 | 10/1973 | Weigert | 156/62 |
| 3,846,533 | 11/1974 | Carrier | 264/220 |
| 3,993,813 | 11/1976 | Grieco et al. | 264/162 |
| 4,016,235 | 4/1977 | Ferro | 264/255 |
| 4,127,689 | 11/1978 | Holt | 428/38 |
| 4,205,036 | 5/1980 | Trame | 264/255 |
| 4,217,326 | 8/1980 | Goralnik | 264/254 |
| 4,252,847 | 2/1981 | DelGrande | 428/38 |
| 4,302,260 | 11/1981 | Meltzer | 156/63 |
| 4,343,758 | 8/1982 | Goralnik | 264/254 |
| 4,483,813 | 11/1984 | Longo | 264/219 |
| 4,557,772 | 12/1985 | Crist, Jr. | 156/62 |
| 4,619,850 | 10/1986 | Charlton | 428/38 |

FOREIGN PATENT DOCUMENTS

| | | | |
|---|---|---|---|
| 990506 | 6/1976 | Canada . | |
| 135035 | 4/1979 | German Democratic Rep. | 264/219 |
| 50-20113 | 7/1975 | Japan | 264/247 |
| 51-18464 | 6/1976 | Japan | 264/255 |
| 53-41360 | 4/1978 | Japan | 264/225 |
| 59-124805 | 7/1984 | Japan | 264/219 |
| 62-187002 | 8/1987 | Japan | 264/225 |

*Primary Examiner*—Jeffery Thurlow
*Assistant Examiner*—Mathieu Vargot
*Attorney, Agent, or Firm*—Larson and Taylor

[57] ABSTRACT

A method of making a window pane that has a plurality of glass pieces arranged in a predetermined pattern and joined at adjacent edges by cames having flanges on both faces of the pane. The method includes the steps of making a mold of both faces of a master window to be duplicated, positioning pieces of glass which are copies of these used to make the original onto the molded surface of one mold with the edges of each piece of glass adjoining the open channel pattern of the mold, said pattern produced by the cames of the master window. The faces of the mold portions are joined, clamping the glass pieces between them. Moldable, colored resin is introduced to fill the spaces between the glass pieces and allowed to set. The finished article is then removed from the mold and has cames which faithfully duplicate in pattern, color and texture the leaded cames of the original.

16 Claims, 6 Drawing Sheets

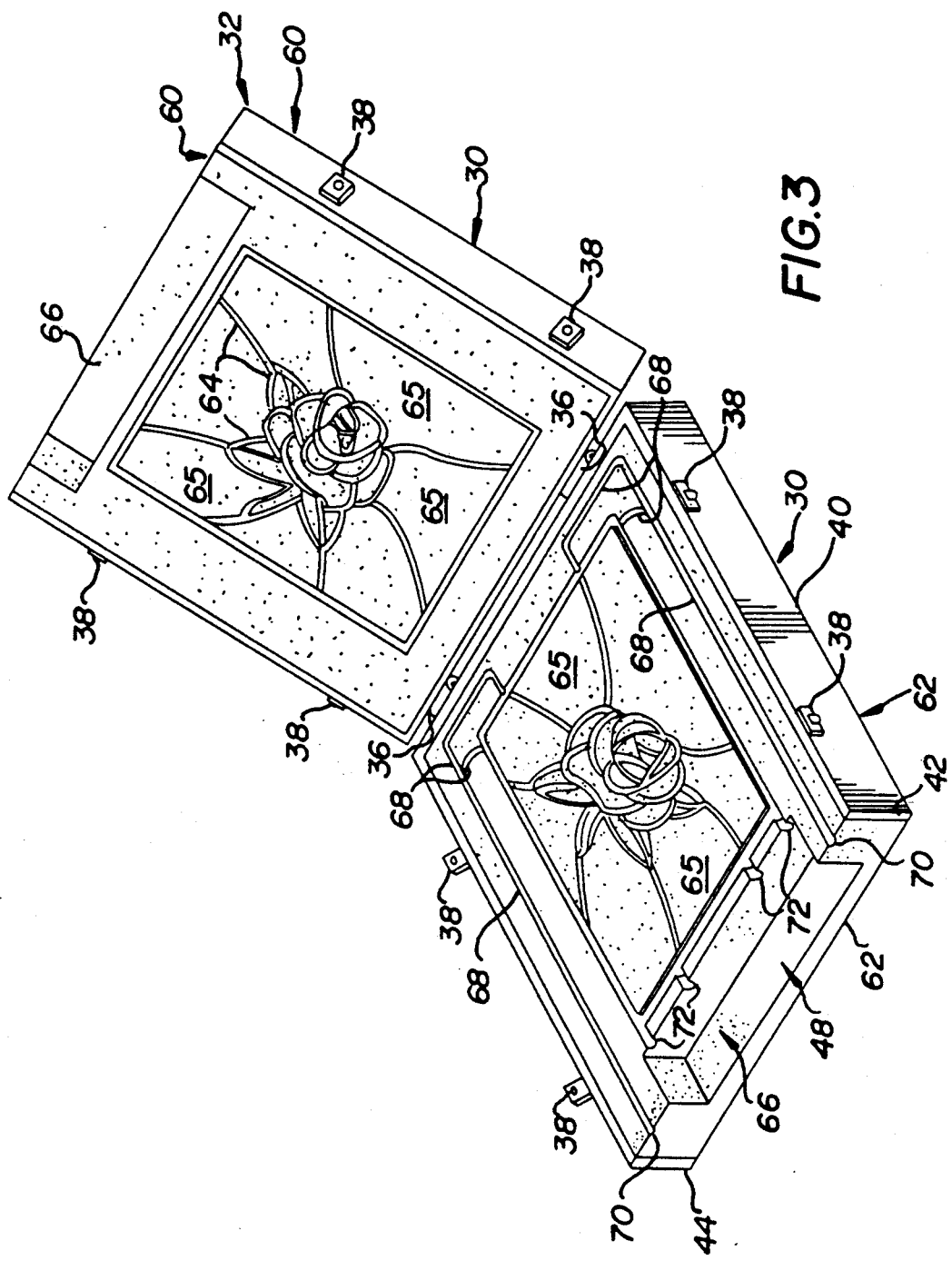

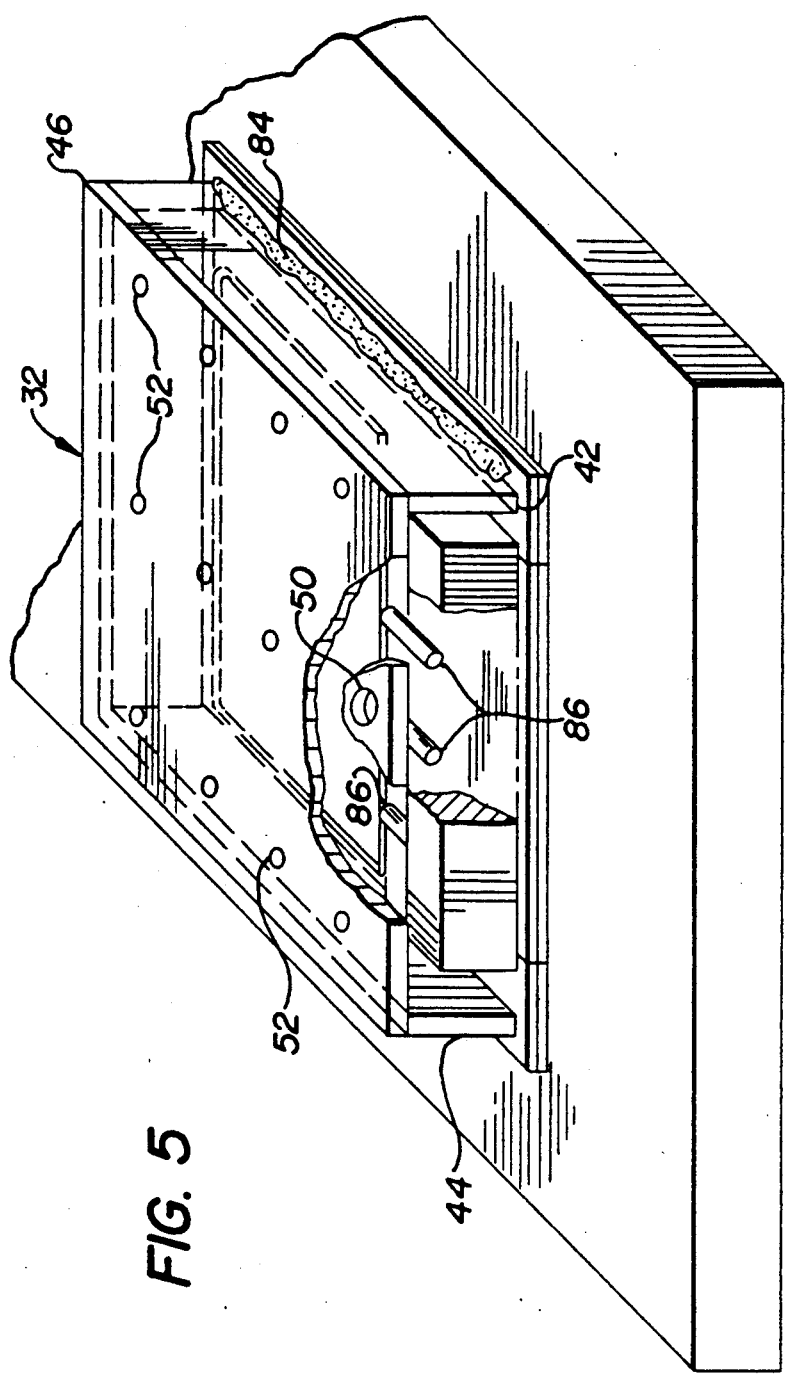
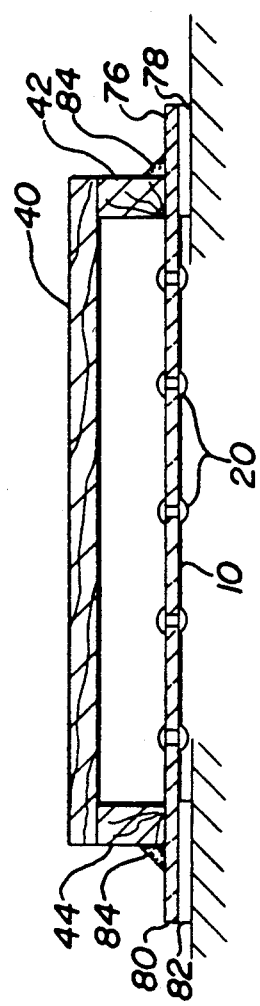
FIG. 5
FIG. 6

METHOD OF MAKING A STAINED GLASS ARTICLE

FIELD OF THE INVENTION

This invention relates to a method for making articles from cut glass, such as panels or windows, in which pieces of glass are joined at adjacent edges using moldable material in a predetermined pattern.

BACKGROUND OF THE INVENTION

Leaded glass windows, popularly known as stained glass windows, have been a popular tradition since before the Renaissance. The windows or panels are made of individually cut pieces of glass which are joined by soldered H-shaped lead cames that support the glass pieces at adjacent edges. The pieces of glass are often of different colors and cut in predetermined shapes to produce a desired design. The methods used to make the traditional product have changed little to the present time and require a tremendous amount of labor to hand cut, assemble and solder the pieces of glass and lead together.

Due to the increasing popularity of incorporating the windows or panels into doors and windows of buildings, such as churches and residences, and into various articles of furniture, there is a need for a method of making the articles in a faster, more efficient and more economic way.

In addition, there is a need to overcome the several disadvantages of traditional leaded glass windows. These disadvantages include weight and the inability of lead to adhere to the glass resulting both in air and water leakage and in loose glass pieces. Over time lead will decay or rot, clay applied to the window as an additional sealant will dry out, break up and fall out, and because of the weight the window will sag.

Various methods have been proposed for making simulated stained glass windows. The goals have been two-fold: to reduce the amount of labor needed, and thus the cost; and to make an article which is stronger and more trouble-free than those made in the traditional way.

A variety of prior art methods are disclosed in the following U.S. patents. Charlton, U.S. Pat. No. 4,619,850, teaches the use of a single glass pane with a unitary, pre-cast reticulated came network adhesively applied to the surface of the glass. Meltzer, U.S. Pat. No. 4,302,260, discloses a method of simulating stained glass using pieces of textured plastic joined at the edges by plastic adhesive. Goralnik, U.S. Pat. Nos. 4,217,326 and 4,343,758, disclose a method of making a cut glass panel comprising a plurality of cut glass pieces joined by cames made of epoxy resin in a predetermined pattern. The method comprises the steps of: a) producing a silicone mold with grooves in the face in the pattern of the cames; (b) pouring epoxy resin into the grooves to form the flanges for one side of the glass panel and allowing it to cure; (c) removing the flanges from the mold; (d) positioning pieces of glass on the mold; (e) filling the spaces between adjacent glass pieces with epoxy resin; (f) arranging the previously formed flanges on the upper surface of the glass pieces so as to adhere to the epoxy resin at the top of the spaces; (g) allowing the entire assembly to cure; and (h) removing the completed panel from the mold.

Additional methods are disclosed in the following U.S. patents: Gibson, U.S. Pat. No. 3,183,140 (pattern etched into glass and filled with colored composition); Nussbaum, et al., U.S. Pat. No. 3,563,835, (L-shaped frame supporting glass pieces with a cover having flat strips simulating the cames); Taylor, U.S. Pat. No. 3,619,456 (plastic cames are pre-formed and a liquid plastic is poured into the spaces on top of a removable filler); McCracken, U.S. Pat. No. 3,713,958 (pane of clear glass supports color layers on one side and cames on the other); Holt, U.S. Pat. No. 4,127,689 (plastic cames disposed on top surface of a glass sheet); Ferro, U.S. Pat. No. 4,016,235 (die mold contains a plastic film with dark strips in registry with die recesses and has a liquid resin injected into mold cavity); and Del Grande, U.S. Pat. No. 4,252,847 (joins pieces of glass together with an adhesive containing solder).

Many of the foregoing procedures have their own disadvantages, including the inability to produce a realistic stained glass window, the cost to set up a production run and overall weakness of the resultant product. Thus, there is still the need for a method that produces a realistic product that still overcomes the aforementioned defects.

SUMMARY OF THE INVENTION

One of the objects of the present invention is to provide a method of making a decorative stained glass article, such as a panel or window which retains much of the authenticity and, thus, aesthetics of the traditionally made leaded glass panel or window, but without many of its structural disadvantages, and at significantly lower cost. Another object is to produce decorative stained glass panels having consistent dimensions and quality by a process which lends itself to a volume or mass production. The present method also produces a product that is more structurally sound than traditional leaded stained glass, yet is almost visually indistinguishable therefrom.

By the method of the present invention, the major aesthetic attractions of the traditional process are preserved: the same type of glass used in the traditional process can be used by the invention, and the surface characteristics and color of the cames and solder joints are faithful reproductions of the lead cames which were used to make the molds.

The inventive method achieves significant cost savings over conventional means in production, through the considerable reduction in labor and time required to make a panel. Production can be increased by increasing the number of molds, without increasing the number of employees.

In one embodiment of the present invention, a resin product is poured into the mold to form the cames.

Resin has a greater adhesion to glass, does not allow the glass to rattle in place as with lead, provides a watertight seal without the need for caulking; and is far lighter than lead. In addition, the resin does not crack or deteriorate over time. By producing a lighter weight product the stained glass article will not warp over time.

The cost of resin is far less than that of lead (approximately 10%). This, combined with the considerable savings in labor costs by using the inventive method, yields a significant overall cost reduction.

The method of this invention of making a cut glass panel begins with the step of providing a master panel to be duplicated that has cames around separate pieces of glass, said cames having raised surfaces with respect to both surfaces of the glass panel. A mold of elastomeric material is then made of each.

The molds have a pattern of connected indentations, produced by the cames of the master panel.

Then, one or more pieces of glass which match those of the master panel are positioned into corresponding locations on the face of one mold and the other mold is placed on top thereof so that indentations in the other mold face are in registry with indentations of the one mold, the joined molds holding the glass pieces tightly in place. A liquid bonding material is then introduced into the mold and permitted to fill all of the channels. After the material has cured, the article is removed from the mold.

Thus, the glass panel made according to the method of the present invention comprises a plurality of cut glass pieces joined by cames arranged in a predetermined pattern between adjacent edges of the glass, the cames comprising webs having flanges on both sides of the glass panel, said cames being made of a curable resin.

These and other objects, features and advantages of the present invention will be further understood by those skilled in the art upon consideration of the following description of the preferred embodiment.

BRIEF DESCRIPTION OF THE DRAWINGS

FIG. 3 is a perspective view showing an opened mold enclosure box having two mold box halves, each half containing a mold of one side of the master window depicted in FIG. 1.

FIG. 5 is a perspective view, with parts broken away, of an inverted mold enclosure, depicting the configuration for making the mold of one side of the master panel.

FIG. 6 is an end elevational view, with parts removed of the mold enclosure depicted in FIG. 5.

DETAILED DESCRIPTION OF THE PREFERRED EMBODIMENTS

Figure 1:
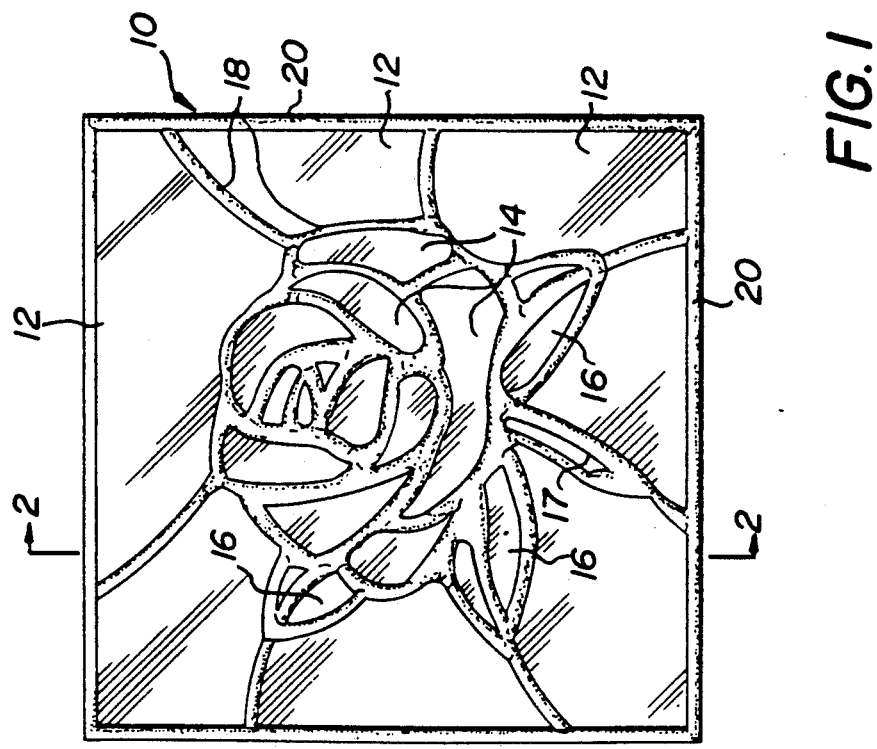
FIG. 1 is a plan view of a master stained glass leaded window panel used to make a mold.

With reference now to the figures, wherein like numerals represent like elements throughout the several views, a master panel 10 is depicted in FIG. 1. In the method of making a glass panel according to the present invention, master panel 10, which depicts a rose and utilizes four colors, is first made in a conventional manner using the requisite number and color of glass panels or pieces, such as pieces 12 (depicting a blue background), 14 (depicting the red rose petals), 16 (depicting the three green leaves) and 17 (depicting the brown stem) to make the desired design. H-shaped lead cames 18 are around the peripheries of each piece and hold them together as a single window. In addition, master panel 10 has a peripheral H-shaped lead came 20 extending completely around the periphery thereof which holds together all of the pieces. In traditional leaded glass windows, the number of pieces of glass are determined not only by the overall design appearance created by the cames, but also by the ability to cut a particular shape of glass without the glass breaking. Occasionally, a glass panel will also have an external frame of wood, metal or other conventional structural material. However, these frames are normally added after the panel is made and thus have not been shown in FIG. 1.

Figure 2:
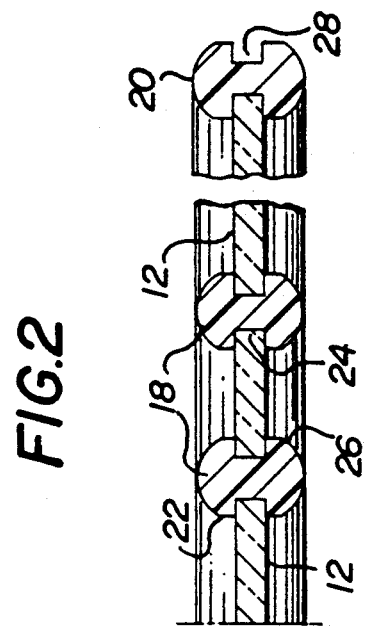
FIG. 2 is a sectional view taken along lines 2—2 of FIG. 1, showing the glass pieces fitted together with cames.

As particularly seen in FIG. 2, interior cames 18 and peripheral cames 20 are raised above the surface of panels 12, 14 and 16. Cames 18 and 20 have the traditional H-shaped cross section with an upper flange 22, a heart or web 24 and a lower flange 26. Because peripheral came 20 only has glass on one side, it provides a peripheral groove 28, the purpose of which will become clear in the description below of the making of a mold box 30 (FIG. 3). In the preferred embodiment, glass pieces 12, 14 and 16 of master panel 10 have a thinner cross-sectional thickness than the glass pieces utilized in the subsequently manufactured panels. Typically, glass pieces 12, 14 and 16 in master panel 10 have a cross-sectional thickness of a 1/16 of an inch whereas the corresponding pieces in the finished product have a cross-sectional thickness of 3/32 to ⅛ of an inch. As will be discussed subsequently, this helps to produce a mold having a tighter seal with the glass pieces.

Figure 4:
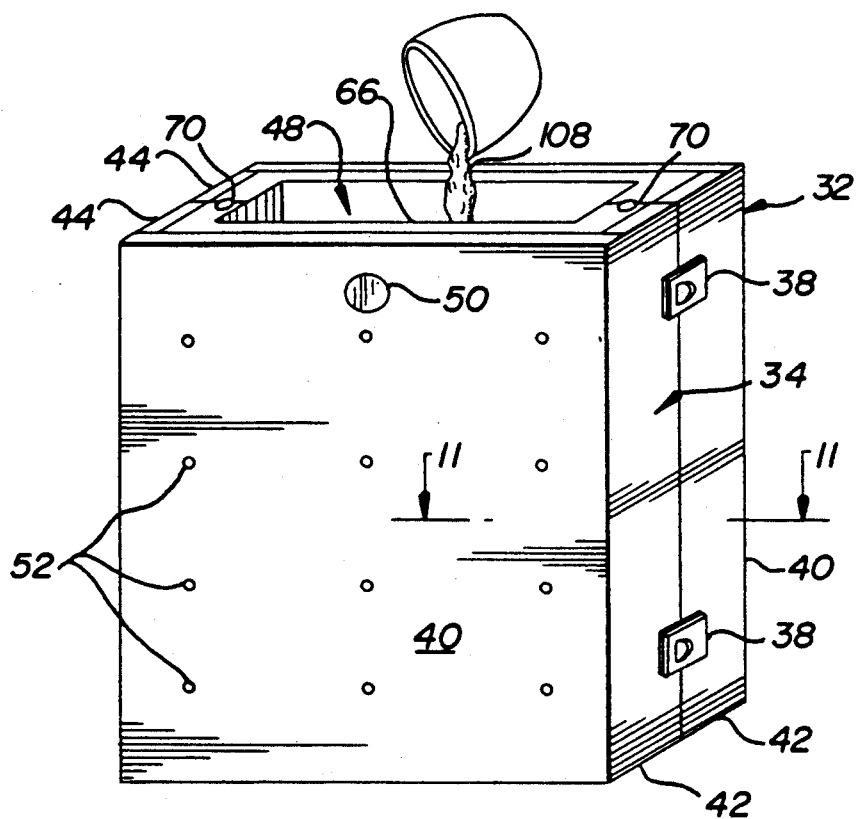
FIG. 4 is a perspective view of the mold enclosure box of FIG. 3 depicted in a closed, latched position and receiving a mold material.

The present invention utilizes a die casting method that employs mold box 30 which is depicted in an opened position in FIG. 3 and in a closed position in FIG. 4. Mold box 30 is preferably made from ½ or ¾ inch plywood and is comprised of an upper mold half 32, having a wood housing 33 and a lower mold half 34, having a wood housing 35 connected together with conventional hinges 36. Mold halves 32 and 34 can be locked together in the closed position, as shown in FIG. 4, by conventional latches 38. Preferably, latches 38 are conventional cam latches which gradually close the two halves in a sealed relationship as the latches are rotated.

Figure 9:
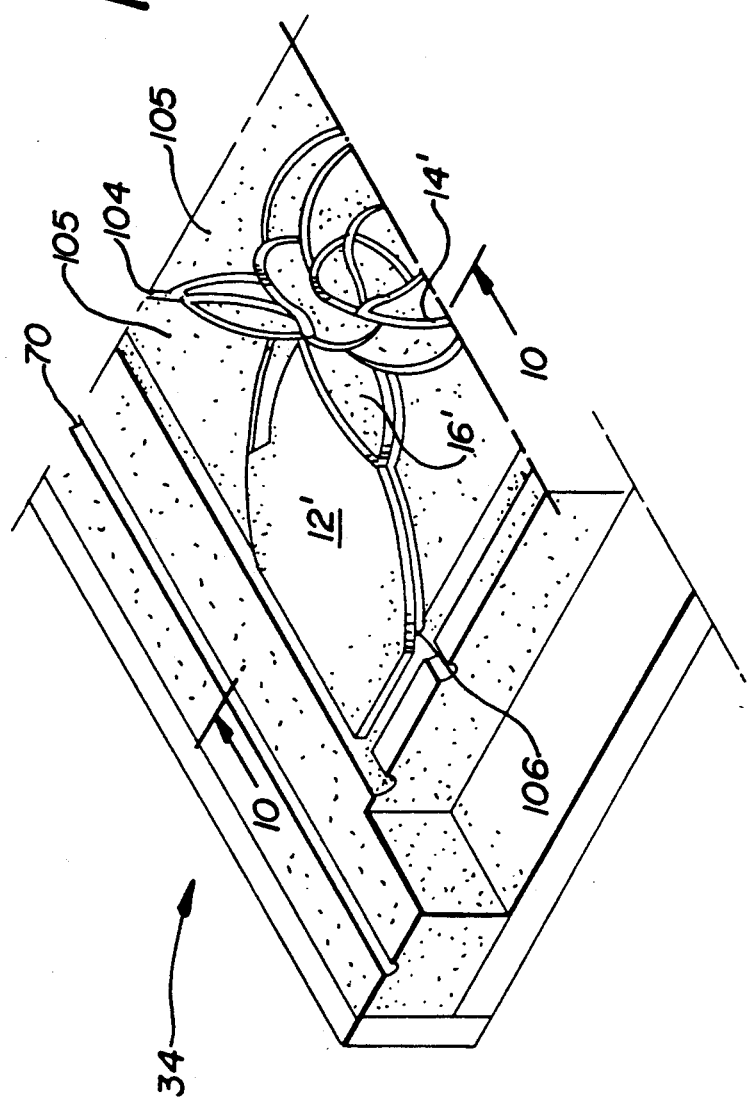
FIG. 9 is an enlarged perspective view of a corner portion of the mold shown in FIG. 3 after some glass pieces have been placed between the channels formed in the mold surface.
Figure 10:
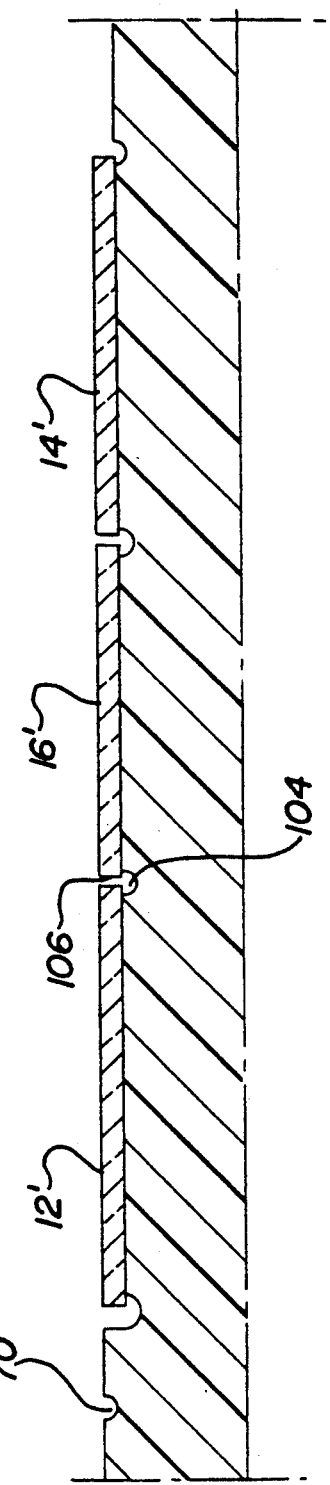
FIG. 10 is a sectional view taken along line 10—10 of FIG. 9.

Referring also now to FIG. 9, it is seen that each mold housing 33 and 35 of mold box 30 has a wood bottom 40, two wood upstanding sides, 42 and 44, and a wood back 46 which together define a cavity 48. Mold halves 32 and 34 are substantially similar, except as discussed hereinbelow, and have an internal cavity with dimensions that are determined by the size of master panel 10. In general, cavity 48 has a depth that is about ½ inch thicker and a width and length that is about three inches bigger than master panel 10. Access is permitted into cavity 30 through an orifice 50 in mold box bottom 40. Orifice 50 provides a nozzle for adding a silicone rubber compound used to make the mold of master panel 10 and a plurality of vents 52, in bottom 40 arranged in three columns, permit air to be expelled. In FIG. 4, orifice 50 and vents 52 are shown plugged up with the silicone mold material used to make the mold.

Also as depicted in FIG. 3, mold halves 32 and 34 each contain a mold 60 and 62, of corresponding sides of master panel 10. Mold 60 and 62 are preferably made of molded silicone rubber that can be conventionally purchased, such as mix number GI550 silicone rubber manufactured by Silicones, Inc. Molds 60 and 62 are made to a process described in greater detail hereinbelow. In general, however, each mold is similar and comprises a plurality of channels 64 which conform exactly to the pattern and shape of cames 18 and 20 of master panel 10. Channels 64 also define a plurality of enclosed, relatively raised, planar shaped surfaces 65 which conform exactly to the shapes of the individual panes or panels of glass 12, 14, 16 and 17 of master panel 10 as defined by the peripheral cames. Each mold 60 and 62 is also provided with a reservoir 66 into which a plastic material that will become the cames is later poured. Mold 62 also contains a plurality of vent channels 68 which connect the bottom channel 64 of the mold design with an orifice 70 in the top face of mold 62. A plurality of pour orifices 72 are provided in mold 62 between reservoir 66 and mold channel 64.

Alternatively, the master panel can be specially made out of a single pane of glass. In this case, only the upper flange 22 and lower flange 24 of the interior lead cames 18 are utilized. Flanges 22 and 24 are cut and shaped so that when put together they replicate the desired pattern. Flanges 22 and 24 are then glued into place on top of the pane of glass. This method of making the master panel has the advantage of producing a master panel having a planar surface. In traditional leaded glass windows, the pieces of glass are usually skewed or tilted with respect to the plane defined by the overall window. When a mold is made of such tilted pieces, the surfaces of the mold will also have the same orientation. This then results in a leakage of the plastic material (used to replicate the cames) onto the glass panels.

Figure 7:
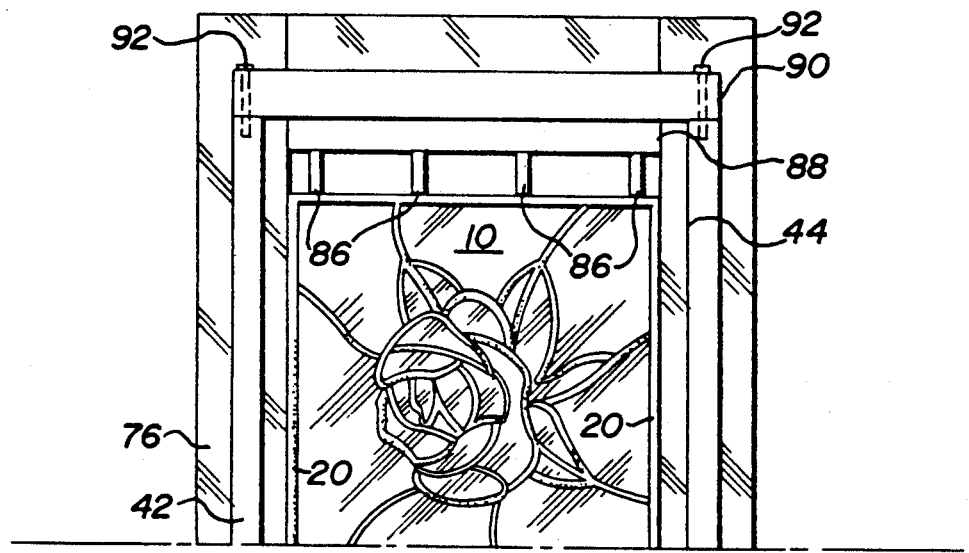
FIG. 7 is a partial top plan view, with parts removed, of the mold enclosure depicted in FIG. 5.

With reference now to FIGS. 5, 6 and 7, the apparatus for making molds 60 and 62 will be described. A wooden housing 33 of upper mold half 32 is depicted in FIG. 5 in an inverted position on a table 74. Pour spout or orifice 50 and vents 52 are clearly depicted in an open condition.

As seen in FIG. 6, mold box sides 42 and 44 are supported on two pieces of glass, side 42 being supported on upper glass 76 and lower glass 78, and side 44 being supported on upper glass 80 and lower glass 82. Upper pieces of glass 76 and 80 are mounted in peripheral came groove 28 of master panel 10 and lower pieces of glass 78 and 82 are used as shims. Clay 84, or other sealant, forms a fluid tight seal between sides 42 and 44 and pieces of glass 76 and 80. Additional pieces of support glass and shim glass extend around the periphery of upper mold half 32, as seen in FIG. 5, and form an annular frame support for upper mold half 32.

A plurality of dowels 86 (see also FIG. 7) are positioned with one end abutting master panel 10 on one end and a shaping block 88 at the other end. As should be obvious to those skilled in the art, dowels 86 are used to make pour orifices 72 and shaping block 88 is used to form reservoir 66. A sealing block 90, shown in FIG. 7, covers the entire opening of mold box 30 and is attached to sides 42 and 44 with fastening means such as screws 92.

Figure 8:
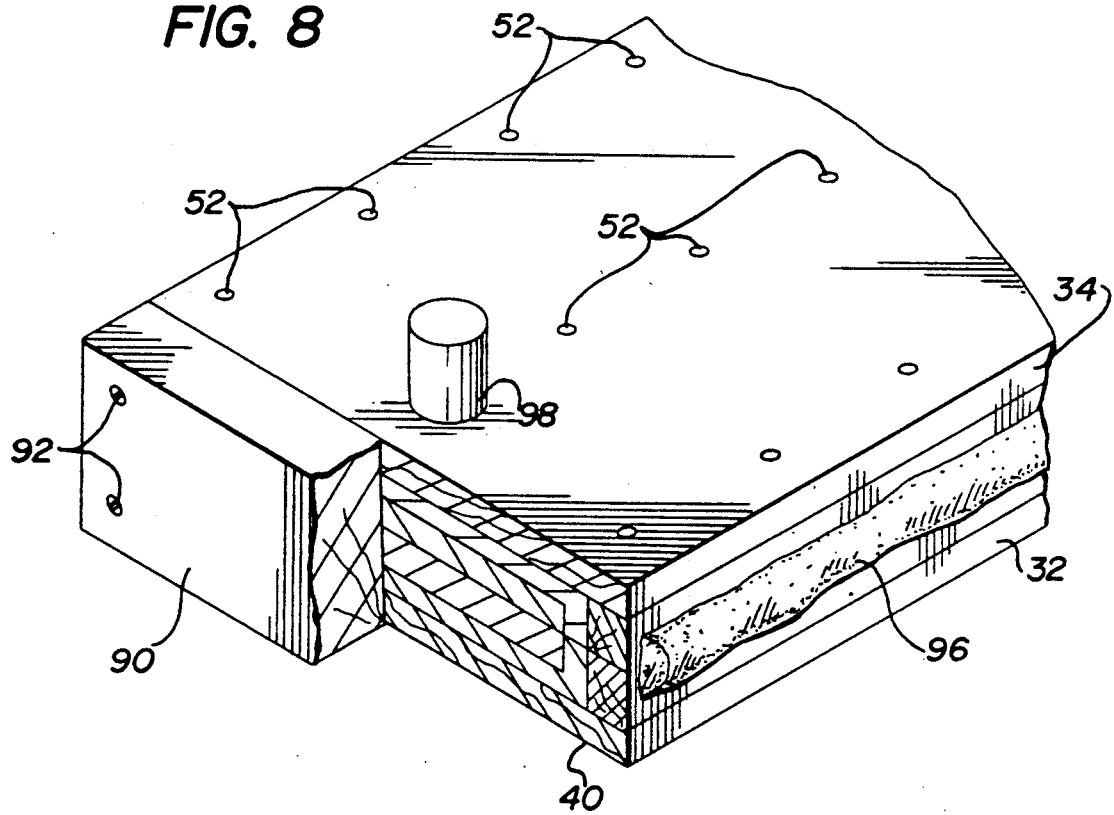
FIG. 8 is a partial perspective view, with parts broken away, depicting the two mold enclosure halves in registry in preparation for making the second mold.

With reference now to FIG. 8, mold halves 32 and 34 are shown in a clamped together configuration, with mold 60 having been made and ready to pour the silicone rubber for making mold 62. Fastening means, such as staples 94 and a sealing means such as a clay 96, make a fluid type container. A nozzle 98, which extends into pour orifice 72, permits the addition of the silicone molding rubber. A second shaping block 100 rests on top of shaping block 88 and will result in the creation of a reservoir 66 in lower mold half 34. The front of the mold is again sealed with sealing block 90 attached with screws 92 to mold box 30.

With reference now in particular to FIGS. 5, 6 and 7, method for making upper mold half 32 will now be described. Initially, housing 33 is constructed having a cavity size as described above in which each of the component parts are rigidly connected together, such as by using screws and glue. The master panel 10 to be duplicated is then placed on table 74 and upper pieces of glass 76 and 80 together with the end upper pieces of glass are inserted in the corresponding grooves in peripheral came 20. Clay is then used to seal came 20 to the corresponding glass pieces. Shim glass 78 and 82 is then installed so that they are level and not tilted. Clay 84 is applied to seal both housing sides 42 and 44 and housing back 46 to the corresponding pieces of glass 76 and 80. Dowels 86 are then placed extending on top of the upper pieces of glass from the end of master panel 10 toward the opening in housing 33. Shaping block 88, which will result in the making of reservoir 66, is then placed inside housing 33 in an abutting relationship with dowels 86. Finally, a sealing block 90 is rigidly attached to housing 33 and additional sealing clay (not shown) is used to create an overall seal.

After the silicone rubber is mixed, it is poured into a pouring spout (not shown in FIG. 5, but similar to spout 98 in FIG. 8) and the progress of the travel of the liquid rubber is followed as it successfully emerges through vent holes 52. Once the rubber emerges through a vent hole 52, the vent hole is plugged with clay. After the entire mold cavity 48 is filled, the material is allowed to cure, usually for a period of twelve to twenty-four hours. After the mold material has been cured, the mold half 32 is inverted on table 74 and sealing block 90 and pieces of glass 76, 78, 80 and 82 are removed and clay is added to fill in groove 28 of peripheral came 20. An additional shaping block 100 (see FIG. 8) is then placed on top of shaping block 88, sealing block 90 is reattached, and the two mold halves are fastened together with staples 94. Clay 96 is then applied all around the joints of mold box 30. A second portion of similar elastomeric material or rubber silicone is introduced in liquid form through spout 98, as before, until mold cavity 48 is entirely filled and the silicone rubber is emitted through vents 52, after which the vents are plugged with clay.

In order to assist in the release of the cured mold material, the faces of master panel 10 can be coated with a conventional, well-known mold release material. After mold half 32 is made, mold release is also applied to its edges so they will not bond to the mold of mold half 34. When fully cured, the sealing clay 96 and staples 94 are removed, as are screws 92 so that sealing block 90 can be removed. Then, the two mold halves 32 and 34 are separated and the two shaping blocks 88 and 100 are removed. If necessary, air pressure may be used to aid in the separation and release of master panel 10.

Upon removal of master panel 10, patterns of the cames of master panel 10 are left embedded in an exact replication of the shapes and contours thereof in molds 60 and 62. The pattern is comprised of a fully connected together series of channels 104 in an otherwise smooth, flat surface 105.

Mold halves 32 and 34 are then connected together with hinges 36 and latches 38 are carefully attached thereto, thereby resulting in a fully completed mold box 30.

Figure 11:
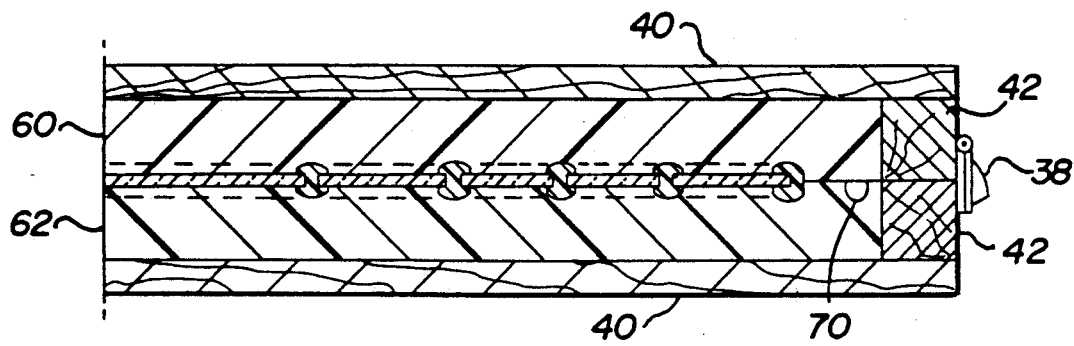
FIG. 11 is a sectional view taken along line 11—11 of FIG. 4 showing the glass pieces held in place between the mold portion and the channels filled with resin.

The method now includes making a duplicate of master panel 10 by carefully placing previously cut pieces of glass spaced from each other, but each over a part of channels 104. In FIG. 9, only pieces 10′, 14′ and 16′ are shown as having been put into place. When carefully aligned, a small gap 106 will be created between the adjacent edges of neighboring pieces of glass. As mentioned above, the glass used to duplicate the master panel is preferably thicker than the glass of master panel 10 itself so that a better seal is achieved against the surface of molds 60 and 62. This is shown in FIG. 11. The center of each gap 106 should fall over the corresponding channel 104.

After all of the pieces of glass are in position, mold box 30 is closed as depicted in FIG. 4 and latches 38 are closed.

As a result of making the molds 60 and 62 in the foregoing manner, an accurate registration of the two mold surfaces is assured when mold box 30 is closed.

As can be seen in FIG. 4, reservoir 66 in each of the mold halves 32 and 34 are combined to form a trough for receiving a polyester resin, or epoxy resin, shown being poured in FIG. 4 at 108. Resin 108 is any commercially available, suitable type that is commonly used in the industry. Preferably, a coloring agent has been added to the polyester resin so as to give the resultant cames the color of lead or a decorative color, as desired. Any common pigment can be used, such as paint or lamp black for coloring. An acceptable resin solution was found to be stock number 53-727P, available from Alpha Resins. This is a typical two-part resin to which a hardener is added that causes the resin to set up. The resin is readily pourable and will set up and harden in about ten minutes.

When resin 108 is poured into reservoir 66, it flows through pour orifices 72 (see FIG. 3) into channels 104. As the resin advances through channels 104, air is released through vent channels 68, which can simply be cut into the face of mold 62 so as to communicate between the lower most channel and orifice 70. In order to enhance the flow of the resin into all of the channels, mold box 30 can be tilted or rocked back and forth.

A resin used may be any of a variety available, including epoxy or polyester. The amount of hardener used will determine the curing time, strength and hardness of the final plastic. Polyester resin has been successfully used and it will adhere tightly to the glass, yet easily release from the silicone rubber of molds 60 and 62.

Upon the completion of the curing, mold portions 16 and 20 are separated, and the completed glass panel is removed. A completed glass panel releases easily from the mold surface, but air pressure may be applied between the panel and the mold surface if necessary. Any leakage of resin onto the glass surfaces can be easily scraped away and the excess resin that fills reservoir 66 and vent channel 68 can be removed.

The completed glass panel is a faithful reproduction of master panel 10 with every detail of the lead solder cames transferred by the elastomeric mold to the resin cames of the duplicate panel. Thus, the duplicate panel has the desired appearance of soldered lead cames, yet without the aforementioned disadvantages. These include a glass panel that has a tight, rattle-free and waterproof fit between the glass pieces, is lightweight and has good strength.

An alternative method that also utilizes a plurality of glass pieces and cames comprises providing a fewer number of glass pieces than defined by the cames. For example, with respect to master panel 10, FIG. 1, one panel of glass is provided for each of the four colors: blue (pieces 12); red (pieces 14); green (pieces 16); and brown (piece 17). Modern glass cutting machines, using high pressure water or lasers, are now available to cut glass in complex shapes without the glass breaking. The same came pattern, however, is utilized to simulate the traditional multi-pane leaded glass window. In this embodiment, some of the cames have the traditional H-shape where two pieces of glass abut one another. The remaining cames, however, are merely adhered to the glass surface. If master panel 10, FIG. 1, is compared to FIG. 9, it can be seen that two pieces of green glass 16 are used to form the leaf, whereas there is only one piece of glass 16 used to make the final article. The appearance of two pieces will be achived after the plastic came is formed on top of piece 16′. It has been found that modern epoxies and polyester resins, unlike traditional lead, tightly adhere to the glass surface. With cames on opposite sides of the glass, it is very difficult to determine if the cames extend through the glass or are merely adhering to the surfaces.

A second alternative method utilizes a single, clear pane of glass and molds the cames to both surfaces. The cames then define the overall pattern. Silk screening or other coloring methods are then utilized to produce the final, simulated leaded glass article having different colored pieces.

Both of the alternative methods produce a product with an overall stronger glass surface and one that is less likely to have the individual small pieces become loose or dislodged, as happens with leaded glass windows. In addition, these methods are less expensive because fewer pieces of glass need to be cut.

The methods of the present invention considerably reduces the labor and cost involved in producing a reproduced glass panel which has retained the aesthetic appearances of the original, traditionally made stained glass master panel 10.

The mold constructed according to the present invention is durable enough to be used repeatedly. Obviously, materials other than wood could be used to make housings 33 and 35. Because of the amount of curing polyester is relatively small, relatively little amount of heat is generated and it has been found that the mold surface does not suffer from any significant deterioration.

While the invention has been described in detail with a particular reference to preferred embodiments thereof, it will be understood that variations and modifications can be effected within this period and scope of the invention. These modifications include, but are not limited to, production of glass articles of various sizes, shapes and curvatures. In addition, panels made from other than glass can be substituted.

It is noted that the present invention has been described with respect to a gravity mold casting method. However, it would be obvious that other molding methods, such as injection molding, could also be used.

I claim:

1. A method of making a decorative stained glass article, said article comprising at least one pane and a plurality of cames joining together to produce a pattern, the method comprising the steps of:

providing a master of the article to be made, said master having at least one individual pane and a plurality of cames having a raised surface with respect to said individual pane and which together define a connected pattern of plurality of individual shapes above and below a plane defined by said individual pane, said pane having a particular shape;

making a mold of one surface of said master article;

making a mold of the other surface of said master article, said one surface mold and said other surface mold having connected, recessed channels below the surface plane of said molds, which channels produce a pattern corresponding to said pattern of said master article cames;

positioning at least one individual mold pane on said one mold surface;

placing said other surface mold in registry with said one surface mold so as to form a mold enclosure;

filling said channels with a liquid bonding material thereby forming said article with said plurality of cames;

curing said bonding material; and removing the finished article from said molds.

2. The method of making a decorative stained glass article as claimed in claim 1 wherein said bonding material is a polyester resin.

3. The method of making a decorative stained glass article as claimed in claim 1 wherein said bonding material is an epoxy resin.

4. The method of making a decorative stained glass article as claimed in claim 1 wherein said mold is comprised of a silicone rubber material.

5. The method of making a decorative stained glass article as claimed in claim 1 wherein said at least one individual pane that is positioned on said mold is thicker than the corresponding at least one pane of said master.

6. The method of making a decorative stained glass article as claimed in claim 1, and further including the step of hinging said molds together after said molds have been made.

7. The method of making a decorative stained glass article as claimed in claim 1, wherein said one surface mold making step comprises the steps of making a housing that has an interior cavity; placing said master article inside said housing cavity; and adding a liquid molding material which sets up and hardens with time on top of said master article.

8. The method of making a decorative stained glass article as claimed in claim 7, wherein said other surface mold making step comprises the steps of making a further housing that has an interior cavity; placing said master article inside said further housing cavity; and adding a liquid molding material which sets up and hardens with time on top of said master article.

9. The method of making a decorative stained glass article as claimed in claim 8, wherein said step of making said other surface mold further includes placing said further housing in registry with said one housing with the master article in between said housings.

10. The method of making a decorative stained glass article as claimed in claim 9, and further including the step of hinging said molds together after said molds have been made.

11. The method of making a decorative stained glass article as claimed in claim 1, wherein a plurality of individual mold panes are placed on said mold surface in juxtaposed locations overlapping corresponding said channels, but spaced apart from each other such that said liquid bonding material can flow between and fill said spaces with the resulting finished article having an H-shaped came at such location.

12. The method of making a decorative stained glass article as claimed in claim 11, wherein the number of individual mold panes equal the number of individual shapes defined by said cames.

13. The method of making a decorative stained glass article as claimed in claim 12, wherein said master article is comprised of a single pane of glass having a pattern of cames adhered to opposing surfaces thereof.

14. The method of making a decorative stained glass article as claimed in claim 11, wherein the number of individual mold panes are less than the number of individual shapes defined by same cames and wherein said liquid bonding material in those said channels located under and over a single mold pane adheres to the surfaces of said mold panes creating the appearance of an H-shaped came.

15. The method of making a decorative stained glass article as claimed in claim 11, wherein each said mold pane has the same general circumferential configuration as the configuration of the corresponding shape defined by said master cames.

16. A method of making a decorative stained glass article, said article comprising a plurality of individual mold pieces and mold cames joining together said individual mold pieces, the method comprising the steps of:

providing a master of the article to be made, said master having a plurality of individual master pieces and master cames joining the peripherals of said individual master pieces to form an integral article, each one of said master cames having a raised surface with respect to said individual master pieces and said master cames together forming a connected master pattern, and said individual master pieces each having a particular shape;

making a mold of one surface of said master article;

making a mold of the other surface of said master article, said one surface mold and said other surface mold having connected channels in a pattern corresponding to said pattern of said master cames, said channels defining a plurality of enclosed relatively raised mold surfaces;

positioning individual mold pieces which generally correspond to the shape of corresponding ones of said master pieces into corresponding positions on said mold surfaces;

placing said other surface mold in registry with said one surface mold so as to form a mold enclosure;

filling said channels with a liquid bonding material thereby forming said article with said plurality of cames;

curing said bonding material; and removing said article from said molds.

* * * * *